INVENTORS.
CHARLES F. HOFMANN
RONALD N. SAMPSON
BY

ATTORNEY.

United States Patent Office 3,290,635
Patented Dec. 6, 1966

3,290,635
DAMPED MAGNETIC CORES
Charles F. Hofmann and Ronald N. Sampson, Monroeville, Pa., assignors to Westinghouse Electric Corporation, Pittsburgh, Pa., a corporation of Pennsylvania
Filed Feb. 7, 1964, Ser. No. 343,414
4 Claims. (Cl. 336—100)

This invention relates to encased magnetic cores impregnated in a particular manner to provide shock resistance and to damp vibrations that would set up undesirable strain in magnetic material and equipment including such cores.

The magnetic alloys used to form cores for magnetic amplifiers are highly sensitive to strains. Consequently their operating characteristics are impaired if any appreciable strain is introduced into the cores. In use the cores may be subjected to vibration, shock and other mechanical strains, for example in aircraft applications, which may alter their characteristics significantly. It is undesirable to fix rigidly these magnetic cores by any mechanical clamps or other holding means since invariably this results in introducing strains with a deterioration of the magnetic characteristics of the core.

During the manufacture of toroidal cores, commonly formed by windings of strip usually below 2 mils in thickness, the strain sensitive magnetic tape-wound cores are sealed in a corebox in order to prevent core strain by windings around the cores. The corebox is filled with a damping medium to prevent shock and vibration from being transmitted from the outside of the corebox to the sensitive core. Some of the silicone oils or fluids have been found very useful as damping fluids in present-day applications, since they do not introduce strain and they dampen vibrations effectively over a broad temperature range. However, such materials are disadvantageous because of the high vapor pressures produced internally when the cores are aged at elevated temperatures. High vapor pressures can result in corebox leakage and severely limit the operating temperature range of magnetic amplifiers. Attempts have been made to utilize silicone rubber gaskets, thermosetting resins and the like in overcoming the foregoing problems, but these have not proven satisfactory.

It is therefore an object of this invention to provide a completely encased magnetic core disposed freely in a non-magnetic enclosure and impregnated with a certain selected silicone gel to minimize vibration and shock strains over the range of temperatures to which such cores are exposed.

Other objects of the invention will become apparent from the following detailed description and discussion of the invention.

For a better understanding of the nature and objects of this invention, reference will be made in the following detailed description to the attached drawing, in which.

Figure 1:
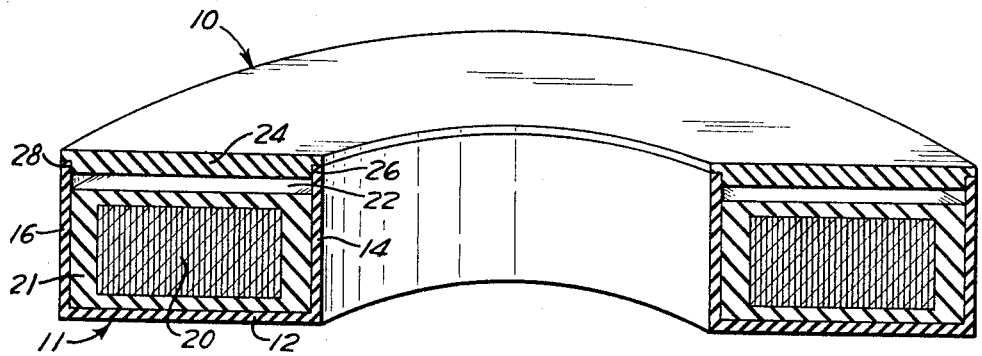
FIG. 1 is a perspective view of an encased magnetic core.

It has now been discovered, and it is on this discovery that the invention is in large part predicated, that magnetic cores of highly strain sensitive materials may be disposed freely within non-magnetic enclosures and impregnated with certain low modulus thermosetting silicone gel material to minimize strain set up by shock, vibration and the like over a range of temperatures from about minus 55° C. to plus 200° C. Generally, the magnetic cores are formed of a magnetic material comprising highly oriented nickel-iron alloys wherein the iron and nickel are in nearly equal proportions, or the alloy comprising between 75 percent to 85 percent nickel, between 2 percent and 7 percent molybdenum, up to 2 percent manganese and the remainder iron, as displosed in Patent 2,631,118, and similar alloys. These alloys are produced in the form of thin sheets of not over 2 mils thickness and may be as thin as ⅛ mil or less. The thin sheets of magnetic material in the oriented state are wound into a toroidal core and then annealed to free them from any strains that may have been imparted during the winding operation. Thereafter, the wound toroidal core is placed within an enclosure in the shape of a toroidal box in which the core is freely disposed with a clearance to prevent binding of the magnetic core. This may be accomplished by providing a thin layer of the cured silicon gel over the bottom of the corebox, and centering the core thereon. Thereafter, the additional gel material is poured around the core, completely encasing it, and that additional gel is cured as by heating for about 2 hours at about 125° C. The enclosure is then sealed, thereby resulting in a core that will withstand any reasonably expected condition of shock, vibration or temperature change. Moreover, no material vapor pressure is developed by the gel and accordingly leakage due thereto does not occur.

A gel suitable for the invention is formed from a reactive siloxane fluid resinous material, and a cross-linking siloxane fluid terminated with a dimethylsilhemioxane. For example, a dimethylsiloxane fluid containing about 0.5 to 2 mol percent of methylvinylsiloxane and having a viscosity of about 650 to 850 centistokes can constitute the primary constituent. This is catalyzed to a gel with about 2.5 to 4.0 percent, based on the resulting mixture, of a dimethylsiloxane fluid which is terminated with dimethylsilhemioxane. The dimethylsilhemioxane terminated dimethylsiloxane fluid is conveniently obtained as a mixture of 30 parts by weight thereof and 70 parts by weight of 750 centistoke dimethylsiloxane fluid. The terminal groups of the dimethylsilhemioxane provide the reactive hydrogen necessary to react with the vinyl group in the fluid and provide some thermosetting characteristics. The reaction is catalyzed in the presence of a platinum catlayst, for example 0.01 to 0.5 weight percent of chloroplatinic acid or the like. A convenient way to include the catalyst is in admixture with the major component, namely the dimethylsiloxane fluid. Curing can be accomplished by heating at about 100° to 200° C. for one-half to 10 hours or more. The resultant resin system is a very low modulus thermoset resin similar to gelatin with essentially no polymerization stress, and it remains pliable as a jelly at temperatures from about minus 55° C. to plus 200° C.

The invention will be described further in conjunction with the attached drawing. Referring now to FIG. 1 of the drawing, there is illustrated an encased toroidal magnetic core unit 10 comprising a resinous toroidal casing 11 having a bottom wall 12, a vertical inside wall 14 and a vertical outside wall 16 thereby forming an annular chamber. The casing can be made of nylon, ethyl cellulose, melamine resins, cellulose acetate, phenolics or other molding compositions. A fully annealed toroidal core 20 comprising a plurality of turns of highly strain sensitive magnetic material is disposed within the annular chamber. Core 20 is not mechanically fastened or otherwise attached to any of the walls of the casing. Completely encasing the core 20 within the chamber is the silicone gel damping material 21. To permit expansion and contraction to take place without the core being bound at any time, a space 22 is provided above the top of the gel 21.

The toroidal casing 11 with the encased magnetic core 20 therein is covered with a ring-shaped cover 24 which, in the embodiment shown, has shoulders 26 and 28 fitting the upper edges of walls 14 and 16. An adhesive can be applied at the shoulders 26 and 28 to hold the cover 24 in place and to seal the chamber. Suitable adhesives or cements are solutions of nylon in a solvent, epoxy resins, and the like.

Numerous cores in accordance with the invention have been prepared and tested. The silicone gel used in each instance was formed from 100 parts by weight of a 750 centistoke dimethylsiloxane fluid containing one mol percent of methylvinylsiloxane and 3 parts per million of chloroplatinic acid, and about 3 parts by weight of a dimethylsilhemioxane-terminated dimethylsiloxane fluid. The mixture was cured to the gel state by heating for about 2 hours at about 125° C., although lower or higher temperatures and shorter or longer curing periods could as well be used.

The testing program consisted of operating a toroidal core in a modified Roberts core test circuit while the core was being vibrated. A pickup winding on the core permits the electrical output voltage signal to be monitored on an oscilloscope to detect any changes in the magnetic core properties due to vibration. Cores were tested and the tests were performed at room temperature, at 75° C., at 150° C. and at 180° C. The toroidal cores were 1 x 1¼ x ⅛, 2 mil highly oriented nickel-iron cores of a commercial type. The coreboxes containing the cores were wound with the required excitation (9 turns), control (3 turns), and output (2 turns) pickup turns and then mounted in an aluminum cup with a ¼ inch steel bolt. The bolt does not link with the magnetic path in the core but is used only to secure the core to the vibrator table. The complete corebox assembly is embedded in an epoxy resin.

The vibrator tests consisted of constant vibration at regular frequency intervals, starting from 10 c.p.s. and increasing in 10 c.p.s. increments to 500 c.p.s. At each frequency interval the acceleration was increased slowly from zero to the maximum obtainable value and then returned to zero (50 G above 90 c.p.s.). The second test was a cycling operation. The cores were cycled through the frequency range from 10 to 500 to 10 c.p.s. at the maximum obtainable acceleration within a period of approximately 15 minutes. The cores were biased in the high gain (70 amps.) linear region of their characteristic curves for all vibration tests.

Figure 2:
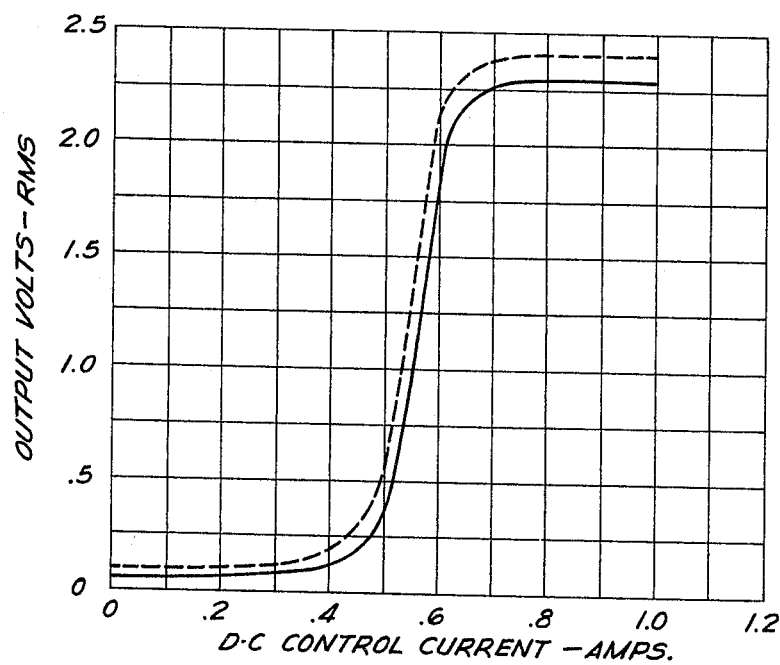
FIGS. 2, 3 and 4 are curves of the output characteristics of cores damped in accordance with the present invention.
Figure 3:
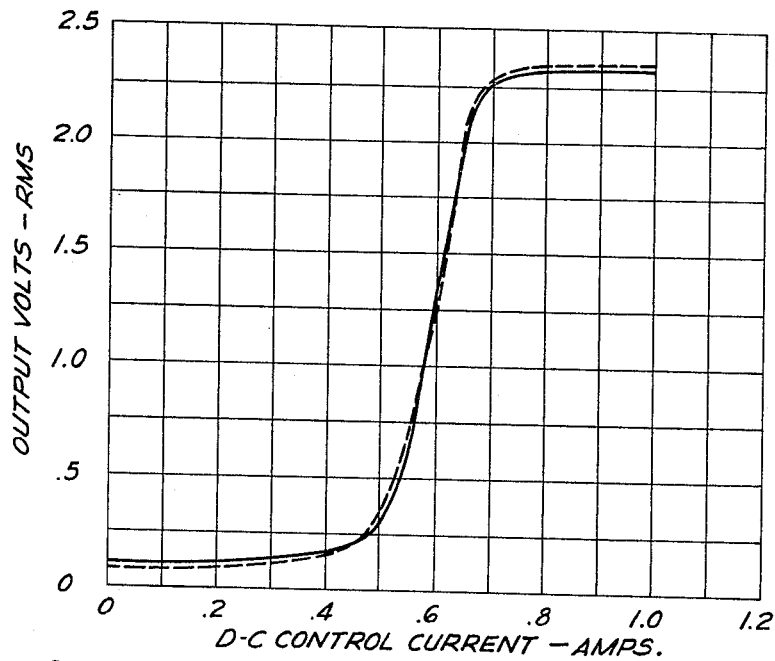
Figure 4:
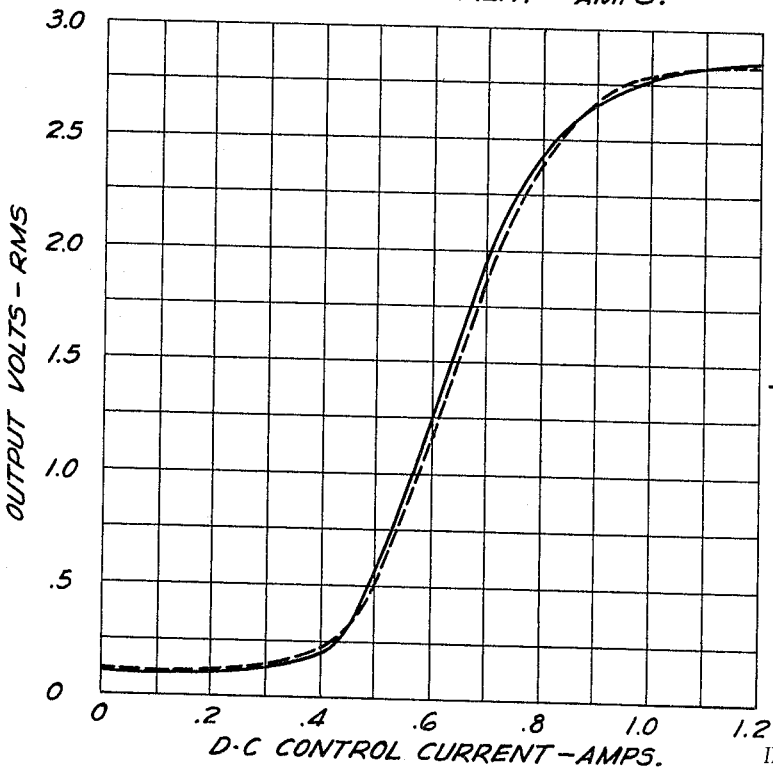

The data for the vibration and temperature tests of the cores, showed only a slight change in magnitude at vibration frequencies about 400 to 405 c.p.s. The resonant frequency of the vibrator occurs at that frequency and is believed to account for the slight change there. No other was found. The output voltage waveform for each core was monitored on the oscilloscope and the magnitude was monitored on the vacuum tube voltmeter for all tests. The cores were biased in the high gain region of their characteristic curves. No change was noticed in the output voltage waveform for all cores and for all the tests. The curves obtained for three room temperature runs are shown in FIGS. 2, 3 and 4 and are representative of the results achieved in all runs. No change in the output voltage waveforms were noticed at the resonant frequency.

In summary, the results of vibration tests at room temperature and elevated temperatures to the very high temperature of 180° C. of three nickel-iron toroidal cores using a silicone gel damping agent show no change in the magnetic characteristics either during or after being subjected to vibrations ranging to 50 G acceleration and frequencies ranging to 500 c.p.s. Considering these results and the further advantages that the gel does not flow and therefore will eliminate leakage problems presently associated with toroidal core operation, it is evident that the present discovery constitutes an important advance in damping magnetic cores.

While the invention has been described with respect to specific detail, it should be understood that changes, substitutions and the like can be made without departing from its scope. For example, while a specific silicone gel composition has been described it should be understood that any silicone gel having the properties of the composition hereinbefore described may be employed equally as well. This equivalence extends, as well, to the catalyst where, for example, any halogen-platinic acid may be used.

We claim:

1. In an encased magnetic core, in combination, a sealed non-magnetic enclosure consisting of an electrically insulating material, having walls forming a toroidal chamber, a toroidally wound magnetic core comprising a magnetic material highly sensitive to strains, including strains induced by vibration, disposed within the toroidal chamber in the sealed enclosure, the magnetic core being freely disposed within the chamber, and a silicone gel composition filling the sealed enclosure to dampen the magnetic core, the composition being composed of 2.5 to 4.0 percent by weight of dimethylsilhemioxane terminated dimethylsiloxane fluid and the remainder dimethylsiloxane fluid containing about 0.5 to 2.0 mol percent of methylvinylsiloxane cured to a gel at an elevated temperature.

2. The method of providing an encased magnetic core in a non-magnetic enclosure comprising forming a gelable mixture comprising about 2.5 to 4.0 percent by weight of dimethylsilhemioxane terminated dimethylsiloxane fluid and the remainder dimethylsiloxane fluid having a viscosity of 650 to 850 centistokes and containing about 0.5 to 2.0 mol percent of methylvinylsiloxane, covering the bottom of a non-magnetic toroidal chamber with a portion of the mixture, placing a toroidally wound magnetic core comprising a magnetic material highly sensitive to strains therein, completely covering the core with an additional quantity of said mixture, then heating the encased core to an elevated temperature to cure the gel.

3. A method in accordance with claim 2 in which the encased core is heated to a temperature of about 100° to 200° C. to cure the mixture to a gel.

4. The encased magnetic core of claim 1 in which the silicone gel composition filling the sealed enclosure to dampen the magnetic core is a silicone composition possessing physical gel properties equivalent to those properties of a composition composed of 2.5 to 4.0 percent by weight of dimethylsilhemioxane terminated dimethylsiloxane fluid and the remainder dimethylsiloxane fluid containing about 0.5 to 2.0 mol percent of methylvinylsiloxane cured to a gel at an elevated temperature.

References Cited by the Examiner

UNITED STATES PATENTS

| | | | |
|---|---|---|---|
| 2,743,308 | 4/1956 | Bardsley | 336—96 X |
| 2,823,218 | 2/1958 | Speier et al. | 260—448.2 |
| 2,999,215 | 9/1961 | Lufcy et al. | 336—218 X |

LEWIS H. MYERS, *Primary Examiner.*

LARAMIE E. ASKIN, *Examiner.*

D. J. BADER, *Assistant Examiner.*